J. A. GREGORY.
CONNECTING DEVICE BETWEEN A DRAFT AND A DRAG MEMBER.
APPLICATION FILED AUG. 3, 1911.
1,029,439.
Patented June 11, 1912.
2 SHEETS—SHEET 1.
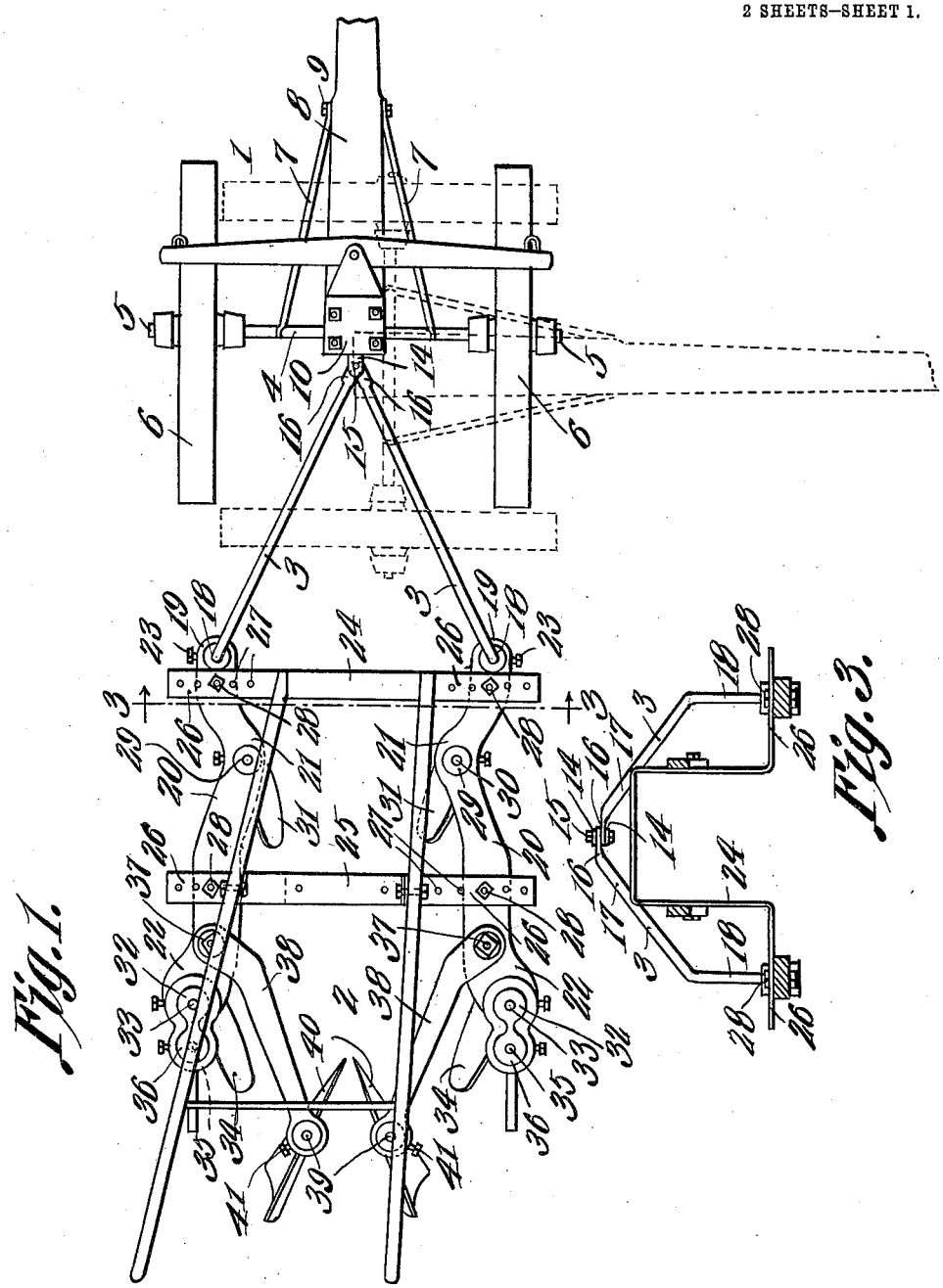

J. A. GREGORY.
CONNECTING DEVICE BETWEEN A DRAFT AND A DRAG MEMBER.
APPLICATION FILED AUG. 3, 1911.
1,029,439.
Patented June 11, 1912.
2 SHEETS—SHEET 2.
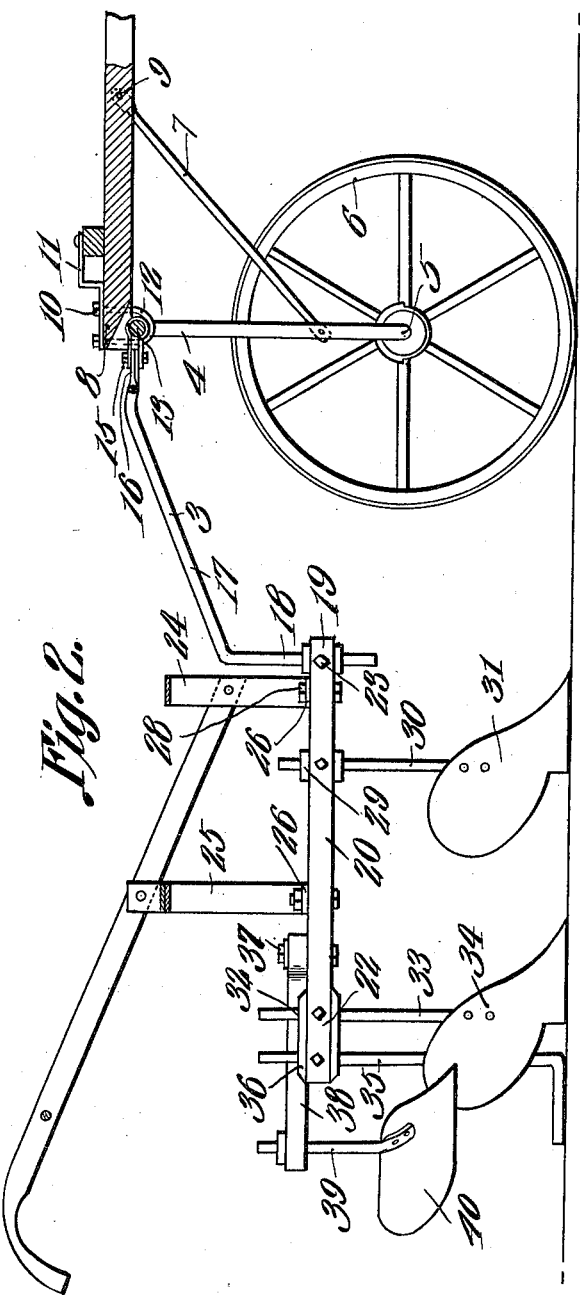
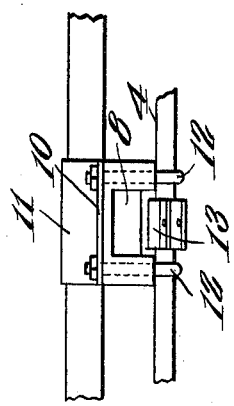
James A. Gregory,
Inventor
by C. A. Snow & Co.
Attorneys
Witnesses

UNITED STATES PATENT OFFICE.

JAMES A. GREGORY, OF WOODVILLE, NORTH CAROLINA.

CONNECTING DEVICE BETWEEN A DRAFT AND A DRAG MEMBER.

1,029,439.

Specification of Letters Patent.

Patented June 11, 1912.

Application filed August 3, 1911. Serial No. 642,212.

*To all whom it may concern:*

Be it known that I, JAMES A. GREGORY, a citizen of the United States, residing at Woodville, in the county of Perquimans and State of North Carolina, have invented a new and useful Connecting Device Between a Draft and a Drag Member, of which the following is a specification.

The present invention relates to improvements in connecting devices especially adapted for connecting a draft member to a drag member, the draft member being for instance a peculiarly constructed two wheeled vehicle while the drag member may be a cultivator, and the primary object of the invention is the provision of such a connection that will permit the free movement of the respective members due to irregularities of the ground, so that one will not affect the operation of the other and also permit the drag member to be readily turned in a very short space in leaving one row and upon entering the next.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the drawings:—Figure 1 is a top plan view of the complete cultivator, dotted lines illustrating the position the draft wheels may take in turning the cultivator from one row to the next. Fig. 2 is a side elevation thereof. Fig. 3 is a section taken on line 3—3 of Fig. 1. Fig. 4 is a detail view of the flexible joint connecting the cultivator frame to the draft member.

Referring to the drawings, the numeral 1 designates the draft portion or member, 2 the cultivator member, and 3 the two connecting arms or rods, for securing the two members 1 and 2 properly and pivotally together.

The member 1 as shown comprises the inverted U-shaped bar or frame 4, having the stub axles 5, upon which are rotatably mounted the hubs of the two relatively large diametered wheels 6, the size of the wheels reducing the friction, in ratio to the distance traveled, when compared with the small wheels usually employed, the two brace rods 7, being connected to the respective terminals of the frame and extending forward to a point upon each side of the draft pole 8, where they are connected as at 9. At the extreme rear end of the pole 8, is connected a plate 10, having the double-tree attaching plate 11, the two U-shaped bolts 12, securing the plate 10 in place and providing a fastening to secure the frame 4 thereto at that point.

Pivoted to the frame 4, between the bails of the bolts 12, is a connecting arm 13, which is held so that its terminals 14 are in spaced relation by means of a bolt or pin 15, which forms a vertical pivot for the upper ends 16 of the arms or rods 3, each one of which is provided with the relatively-long and downwardly inclined intermediate portion 17, terminating in the straight terminals 18, which are normally perpendicular to the ground.

The terminals 18 are removably and vertically adjustable within the ends 19 of the cultivator side frames 20, which as shown have the inwardly curved portion 21, and the rearwardly projecting long ends 22. The terminals 18 are held at the desired adjustment within the ends 19 by means of the set screws 23. Detachably and adjustably connecting the two members of the frame relatively to each other, are the two inverted U-shaped frames or plates 24 and 25, respectively, their terminals 26 being provided with a series of apertures 27, whereby the lock bolts 28 may properly secure the plates to the cultivator frame. Vertically adjustable in the vertical bores 29 of the frame are the rods 30 carrying the inner cultivator blades 31, while similarly adjustable within the bores 32 near the extreme ends of the frames are the rods 33 carrying the blades 34, which produce a furrow exterior of the blades 31, the marker rods 35 being vertically adjustable in the bores 36 provided in the extreme ends of the frames. Pivoted at 37 to each of the frames and adapted to adjustably swing inward are the two arms 38, each one of which has vertically and rotatably adjustable therein the rod 39 carrying the scraper blade 40. By means of the set screw 41 adjusting means each of the respective rods, are not only permitted a vertical adjustment with relation to the ground, but may be rotated or turned to change the angle of the various implements.

By the construction of implement, it is evident that any unevenness of the ground affecting the wheels, by reason of the universal joint with the main draft frame and the rods 3, will not in the least affect the cultivator, and vice versa; and that by reason of the connecting arms being made so long, the draft wheels are not coupled so near the cultivator that they cannot be turned at right-angles thereto, or that the cultivator may be lifted by the operator and swung around manually when desired.

What is claimed, is:—

1. In a wheeled vehicle, the combination of a draft member having an inverted U-shaped frame with stub axles, and a wheel journaled on each stub axle, the rim of the wheels terminating at a point below the top of the frame; a drag frame; and two diverging arms having their forward ends connected by a universal joint to the top central portion of the U-shaped frame and their rear terminals adjustably connected to the forward portion of the drag frame, each arm having a long rearwardly inclined intermediate portion and straight ends, whereby the wheels are permitted to assume a position at right angles to and in front of the drag frame and pass below the intermediate portions of the arms.

2. In a wheeled vehicle, the combination of a draft member having an inverted U-shaped frame with oppositely disposed stub axles forming the extreme terminals thereof, and a wheel journaled on each stub axle; a drag frame provided with two vertically disposed sockets in the forward ends thereof; and a connection between the draft member and drag frame, consisting of two diverging rods, the forward ends of which are connected by a universal joint to the top central portion of the U-shaped frame while the body portions thereof diverge and terminate in vertical terminals, said vertical terminals fitting adjustably within the vertical sockets of the drag frame, and means for rigidly securing said vertical terminals of the rods in said vertical sockets of the drag frame.

In testimony that I claim the foregoing as my own, I have hereto affixed my signature in the presence of two witnesses.

JAMES A. GREGORY.

Witnesses:
 FRANK B. OCHSENREITER,
 LENA WILLSON.

---

Copies of this patent may be obtained for five cents each, by addressing the "Commissioner of Patents, Washington, D. C."